(12) United States Patent
Ohkawa

(10) Patent No.: US 6,339,458 B1
(45) Date of Patent: Jan. 15, 2002

(54) LIGHT GUIDE PLATE, SURFACE LIGHT SOURCE DEVICE OF SIDE LIGHT TYPE AND LIQUID CRYSTAL DISPLAY

(75) Inventor: Shingo Ohkawa, Koshigaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/655,821

(22) Filed: Sep. 6, 2000

(30) Foreign Application Priority Data

Sep. 10, 1999 (JP) .......................................... 11-257349

(51) Int. Cl.[7] ........................ G02F 1/1335; G02B 13/20
(52) U.S. Cl. .......................................... 349/65; 359/599
(58) Field of Search ............................ 349/65, 61, 64; 359/599; 362/31, 26

(56) References Cited

U.S. PATENT DOCUMENTS

| | | | |
|---|---|---|---|
| 5,408,388 A | * | 4/1995 | Kobayashi et al. ............ 362/31 |
| 5,506,924 A | * | 4/1996 | Inoue ........................ 385/129 |
| 5,584,556 A | * | 12/1996 | Yokoyama et al. ........... 362/31 |
| 5,600,455 A | * | 2/1997 | Ishikawa et al. .............. 349/57 |

* cited by examiner

Primary Examiner—William L. Sikes
Assistant Examiner—Dung Nguyen
(74) Attorney, Agent, or Firm—Staas & Halsey, LLP

(57) ABSTRACT

A surface light source device 1 for illuminating a liquid crystal display panel LP comprises a light guide plate 2, primary light source 3, reflection sheet 4 and prism sheet 5. First and second emission promotion regions P1, P2 are formed according to an intermingling distribution so that a major face of the light guide plate 2 provides an emission promotion face. Regions P2 are provided with a smaller emission promotion power as compared with that of regions P1. Ration of covering density of regions P1 to that of regions P2 is set as to vary depending on position in the emission promotion face. Regions P1 are shaped like dome projections tops of which are roughened. Regions P2 are shaped like dome projections or recesses surface of which are provided with a smoothness greater as compared with the surfaces of regions P2. Regions P2 are formed so that they cover among regions P1 without blank in the vicinity of an incidence face 2A to prevent edges from bringing reflective appearance. Distribution of anti regions P1 is set so that brightness distribution is flattened over the emission face 2C.

9 Claims, 4 Drawing Sheets

1: SURFACE LIGHT SOURCE DEVICE OF SIDE

1: SURFACE LIGHT SOURCE DEVICE OF SIDE LIGHT TYPE

LIGHT GUIDE PLATE, SURFACE LIGHT SOURCE DEVICE OF SIDE LIGHT TYPE AND LIQUID CRYSTAL DISPLAY

BACKGROUND

1. Field of Invention

The present invention relates to a light guide plate, surface light source device of side light type and liquid crystal display. More specifically, the invention relates to a light guide plate having a minor face to provide a side end face through which light is inputted and having a major face through which light is outputted, and to a surface light source device of side light type and liquid crystal display which employ the light guide plate.

2. Related Art

It is known to apply a surface light source device of side light type to devices such as liquid crystal display in an backlighting arrangement of liquid crystal display panel. This arrangement is suitable for giving a thin whole structure to the device.

In general, the surface light source device of side light type is provided with a primary light source such as a rod-shaped light source which is arranged beside a guide plate formed of, for example, a transparent resin light guide plate. Illumination light emitted from the primary light source is introduced into the guide plate through a side end face (incidence face) provided by a minor face of the light guide plate.

The guide plate guides the introduced light within the plate and, in the guiding process, ion, causes a major face (emission face) to emit the illumination light. The emitted light is supplied to an object to be illuminated such as liquid crystal display panel through a prism sheet, light diffusion sheet or the like arranged additionally as required.

Two types of employable guide plates are known. Guide plates of one type have a thickness substantially uniform overall. Guide plates of the other type have a thickness tending to reduce with increasing distance from a primary light source. In general, the latter are capable of emitting illumination light more effectively in comparison with the former.

According to a prior art, an emission face or, in some cases, a back face, of a light guide plate provides an "emission promotion face" for promoting emission from the emission face. The prior art enables the emission face to give an increase in emission intensity. Known techniques for obtaining an emission promotion face are as follows.

(1) Utilizing of so-called light scattering pattern; According to this, a great number of locally roughened fine regions (light scattering elements) are formed on a major face of a light guide plate by (a) mat-processing, (b) etching application to an inner surface of mold to be employed in molding of the light guide plate or (c) electric discharge machining. The fine regions are distributed according to a "light scattering pattern". The individual fine regions have shapes such as circular dots. Through varying factors such as size or arranging pitch of individual light scattering elements, occupation area of the pattern per unit area (covering density) can be controlled.

And it is also known to flatten emission intensity (brightness of the emission face) by varying covering density depending on position in the major face (emission face).

(2) Overall roughening of major face; According to this, a major face (emission promotion face) is roughened overall, instead of forming light scattering pattern composed of a great number of locally roughened fine regions. In this case, intensity (brightness of the emission face) can be flattened, according to a prior art, by varying degree of roughening depending on position in the emission promotion face.

However, such prior techniques are subject to a problem. That is, so-called "reflective appearance of edges" are insufficiently avoided. As known very well, "reflective appearance of edges" is a phenomenon that causes an emission face to show a local emission of light which comes via an edge where an incidence face meets a major face (emission face of back face). Such local emission produces line-like excessive brightness zones (bright lines) in the vicinity of the incidence face.

Needless to say, such a phenomenon is undesirable and leads to a remarkable reduction in illumination output quality. If applied to lighting of a liquid crystal display panel, displaying quality will be greatly deteriorated.

Nevertheless the above techniques (1), (2) are able to reduce uneven brightness (bright lines) caused by such reflective appearance to some extent, a problem remains unsolved as follows.

First, if the above technique (1) (light scattering pattern) is applied, a specular surface portion (smooth surface) having no scattering ability remains among the fine light scattering elements composing the pattern, with the result that bright lines are subject to being observed through the portion.

Alternatively, if the above technique (2) (overall roughening) is applied, reflective appearance will be achieved, nevertheless adjusting range of emission promoting ability is hardly wide. For example, a great reduction in brightness tends to be caused on the emission face in the vicinities of the right and left ends of the incidence face due to being near to both ends (electrode portions) of a fluorescent lamp, and accordingly much greater emission promoting ability is required to compensate such a great brightness reduction as compared with the other part. The above technique (2) is, however, scarcely able to give actually such a great difference in emission promoting ability.

OBJECT AND SUMMARY OF INVENTION

An object of the present invention is to provide a light guide plate which is improved so that the above problems are overcome. Another object of the present invention is to provide a surface light source device of side light type free from uneven brightness by the use of the improved light guide plate. Still another object of the present invention is to provide a liquid crystal display capable of avoiding reduction in displaying quality by the use of the surface light source device of side light type.

The present invention solves the above problems by employing a light guide plate having a major face on which tow kinds of light scattering patterns are formed.

First, the present invention is applied to a light guide plate comprising an incidence face provided by a minor face for light input, an emission face for light output and a back face provided by major faces, respectively.

According to a feature of the present invention, said major faces include an emission promotion face on which first emission promotion regions and second emission promotion regions are intermingled according to a distribution.

Said second emission promotion regions have an emission promotion ability per unit area smaller than that of said first emission promotion regions. And, said distribution is set so that covering density of said first emission promotion regions and that of said second emission promotion regions vary depending on position in said emission promotion face.

This enables not only reflective appearance to be prevented but also emission promoting ability to be adjusted in a wide range.

It is preferable that said second emission promotion regions are arranged among said first emission promotion regions without blank. In a typical embodiment, said covering density of said second emission promotion regions tends to decrease according to distance from said incidence face.

The present invention can be applied to a surface light source device of side light type including a primary light source and a light guide plate. The guide plate comprises an incidence face provided by a minor face, an emission face for light output and a back face provided by major faces, respectively, and the plate being arranged so that said light guide plate is supplied with light by said primary light source through said incidence face to cause said emission face to give an illumination output.

According to a feature of the present invention, said major faces include an emission promotion face on which first emission promotion regions and second emission promotion regions are intermingled according to a distribution.

Said second emission promotion regions have an emission promotion ability per unit area smaller than that of said first emission promotion regions. And, said distribution is set so that covering density of said first emission promotion regions and that of said second emission promotion regions vary depending on position in said emission promotion face.

This enables the surface light source device of side light type not only to avoid reflective appearance but also to allow emission promoting ability to be adjusted in a wide range.

Further, the present invention is also applicable to a liquid crystal display including a liquid crystal display panel and a surface light source device. According to a feature of the present invention, the above improved surface light source device of side light type is arranged for supplying illumination light. It is noted that advantages of the surface light source device to which the present invention is applied are reflected onto the liquid crystal display and, needless to say, an improved evenness in brightness of displaying image is achieved.

The above-described and other features will be understood easily from the following detailed description with referring to the attached drawings. It is should be noted that sizes of elements are partially exaggerated as required for the sake of easy understanding in the drawings.

EMBODIMENTS (1)First Embodiment

Figure 1:
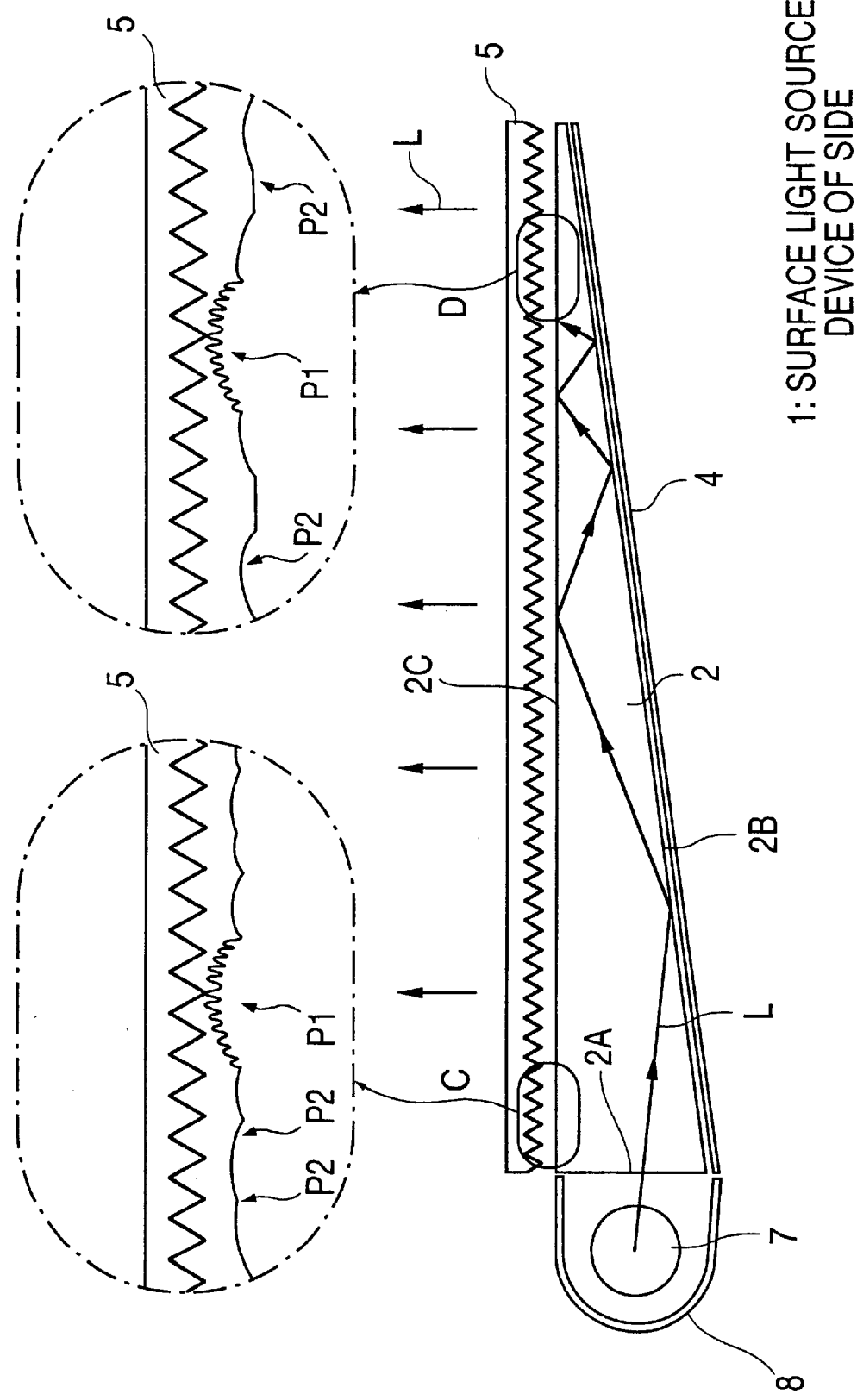
FIG. 1 is a cross section view of a surface light source device of side light type applied to a liquid crystal display of an embodiment in accordance with the present invention.
Figure 2:
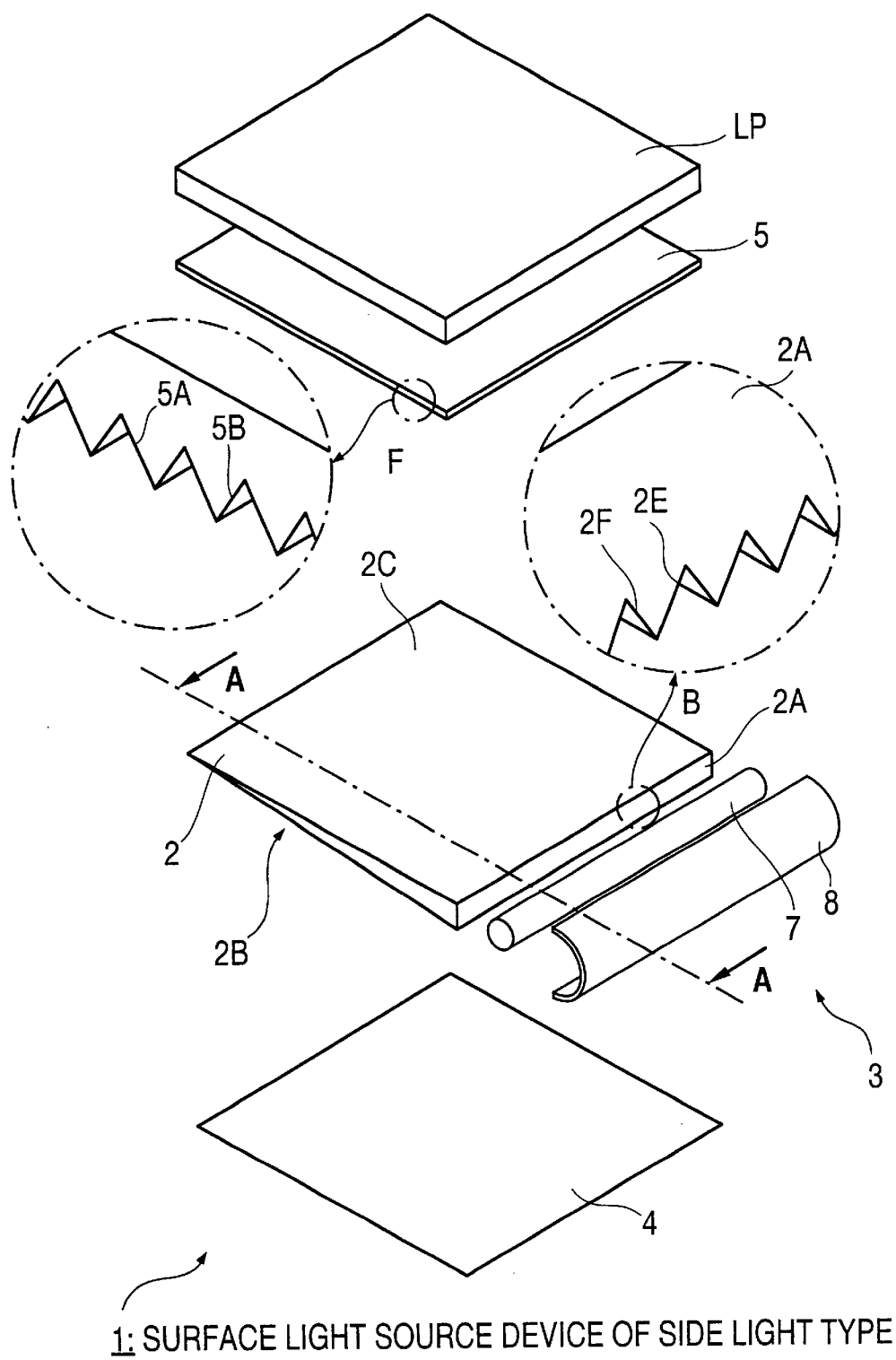
FIG. 2 is an exploded perspective view of the surface light source device of side light type shown in FIG. 1.

Referring FIG. 2, a liquid crystal display according to a typical embodiment of the present invention is shown in an exploded perspective illustration. The liquid crystal display includes a liquid crystal display panel LP and a surface light source device of side light type 1 arranged for illuminating the panel. Referring FIG. 1, a cross section view along line A—A in FIG. 2 to show the surface light source device of side light type 1.

As shown in both figures, the surface light source device 1 comprises a guide plate 2, a primary light source 3, reflection sheet 4 and a prism sheet 5. The reflection sheet 4, the guide plate 2 and the prism sheet 5 are laminatedly arranged in order. The primary light source 3 is arranged along an incidence face 2A provided by a minor face of the light guide plate 2. These elements are mounted and secured in a well-known manner on a frame not shown.

The primary light source 3 is composed of a cold cathode lamp (fluorescent lamp) 7 backed by a reflector 8 with an opening through which illumination light L is incident to the incidence face 2A of the light guide plate 2. The reflector 8 is made of, for example, a sheet material regularly or irregularly reflecting illumination light from the fluorescent lamp 7.

The guide plate 2 is made of, for example, an injection-molded transparent resin such as polymethylmethacrylate (PMMA resin) having a wedge-shaped cross section. The incidence face 2A is a side end face provided by the thicker portion of the wedge-shape. A light scattering pattern is formed in a manners described later on an emission face provided by a major face, The reflection sheet 4 returns light leaked through the back face 2B of the light guide plate 2 into the plate 2 by reflection. This prevent loss of light. The reflection film 4 may be, for example, a white PET sheet effectively and irregularly reflecting light.

The prism sheet 5 orientated so that its prismatic face is directed to the emission face 2C and projection rows run generally in parallel with the incidence face 2A. Each projection row is formed by directly connecting a pair of slopes 5A, 5B, as shown in a partial enlarged illustration in FIG. 2 (arrow F).

The prism sheet 5 corrects an inclined directivity of emission of the light guide plate 2 in a well-known manner. This correction causes a main propagation direction of the emitted illumination light to be modified to an approximately frontal direction with respect to the emission face 2C. A preferable arranging pitch of the projection rows is about 50 μm. Vertical angle of each projection row falls usually within a range from 30 to 70 degrees. Other factors such as prism configuration of the prism sheet 5 may be modified variously, details of which are not described because they are known well.

Further to this, a protection sheet may be interposed between the prism sheet 5 and the liquid crystal display panel LP. The protection sheet is formed of a sheet material provided with a weak light scattering power, preventing the prism sheet 5 from being damaged. Another function of the protection sheet is to make reflective appearance of edges or the like less conspicuous.

The back face 2B of the light guide plate 2 provides a prismatic face. The prismatic face is formed of a great number of fine projection rows running in a direction approximately perpendicular to the incidence face 2A, as shown in a partial enlarged illustration in FIG. 2 (arrow B). Each projection row is has a pair of slopes 2E, 2F directly connected to each other, giving a repeated-ridge-valley configuration.

Vertical angle, namely angle made by the slopes 2E, 2F falls preferably within a range from 50 to 130 degrees, particularly around 100 degrees.

According to a known function of the projection rows, directivity of emission is corrected regarding in a plane parallel to the incidence face 2A. This correction causes the emitted light to be gathered around an approximately frontal direction with respect to the emission face 2C. A preferable formation pitch of the projection rows is about 50 $\mu$m. Such a (size of) pitch keeps the projection rows almost invisible as viewed from above the emission face 2C.

Operation of the surface light source device 1 (behavior of light) is as follows.

The fluorescent lamp 7 emits illumination light which is, directly or via the reflector 8, introduced into the light guide plate 2 through the incidence face 2A.

The introduced illumination light propagates with repeated reflections at the emission face 2C and the back face 2B to approach a distal end of the light guide plate 2. On the way, emission out of the light guide plate 2 occurs at inner incidences to the back face 2B and the emission face 2C depending on the critical angle condition. Emission from the emission face 2C provides the output light of the light guide plate 2. Emission from the back face 2B provides a so-called leaking light. A great proportion of the leaking light is reflected by the reflection sheet 4 to be returned into the light guide plate 2, thereby avoiding loss of light.

As known well, a main propagation direction of the output illumination light from the emission face 2C is inclined forward. This inclination is corrected by the prism sheet 5 in a well-known manner to be directed to the liquid crystal display panel LP at a generally right angle. It is noted that the present embodiment employs the emission face having a first and second emission promotion regions, as described below, which promotes emission from the emission face 2C.

According to a feature of the present invention, a first emission promotion region P1 and the second emission promotion region P2 are formed so that the emission face 2C provides an emission promotion face. In the case of the present embodiment, the regions P1, P2 are formed on the emission face 2C. It is noted that emission promotion regions like P1, P2 may be formed on the back face 2B.

Both regions P1, P2 are distributed so that they are intermingled among each other. Besides, the second emission promotion regions P2 have an emission promotion ability per unit area smaller than that of the first emission promotion regions P1. And, the distribution is set so that ratio of covering density of the first emission promotion regions P1 to that of the second emission promotion regions P2 varies depending on position in the emission face 2C.

It is noted that "covering density of the first emission promotion regions P1," is defined as area occupied by the region P1 per unit area on the emission promotion face. In the same manner, "covering density of the second emission promotion regions P2" is defined as area occupied by the region P2 per unit area on the emission promotion face.

The individual regions P1, P2 provide fine light scattering elements. Each region P1 is provided with a dome-like projection having a roughened surface. This causes the light propagating in the light guide plate 2 to be scattered, leading to promoted emission from the emission face 2C.

On the other hand, each region P2 is formed of a dome-like projection or depression having a surface smoother than the region P1's surface. This causes the light propagating in the light guide plate 2 to be scattered to some extent. Thus, the regions P2 promotes to some extent emission from the emission face 2C, but their emission promotion ability is smaller than that of the regions P1.

As described above, both the first and second emission promotion regions P1, P2 have a function of emission promoting, nevertheless, there is a clear difference between emission promotion ability of the regions P1 and that of the regions P2 due to difference in structure and configuration. Emission promotion ability per unit area of the regions P2 is, for example, about a tenth that of the regions P1.

The second emission promotion regions P2 may be arranged among the first emission promotion regions P1 without blank. Alternatively, some area may remains covered by none of the regions P1 and P2.

In the case of the instant embodiment, regions P2 arranged among emission promotion regions P1 without blank in the vicinity of the incidence face 2A while some blank area remains covered by none of the regions P1 and P2 in a part remote from the incidence face 2A, as shown in partially enlarged illustrations C, D in FIG. 1. Covering density of the second emission promotion regions P2 is designed as to tend to decrease according to distance from the incidence face 2A.

Such a distribution avoids bright lines due to reflective appearance of edges from emerging conspicuously in the vicinity of the incidence face 2A. This is because almost no area remains (smooth or specular) occupied by none of the regions P1, P2 in the vicinity of the incidence face 2A.

If the regions P2 are arranged at a high density to avoid bright lines from being caused by reflective appearance, it is practical that the emission face 2C has a surface roughness in a range from 0.02 to 3.0 $\mu$m in arithmetic average roughness Ra. It is noted that arithmetic average roughness Ra is a unit defined in JIS(Japanese Industrial Standard)-B06011994.

The regions P2 distributed as above give the emission face 2C emission promotion ability which varies depending on position. On the other hand, the first emission promotion regions P1 further additionally give the emission face 2C emission promotion ability according to their distribution.

A finally resultant distribution of emission promotion ability is preferably determined so that emission intensity from emission face 2C is uniform overall. According to a design technique, after distribution of the regions P2 is determined, distribution of the regions P1 is determined so that emission intensity from emission face 2C is uniform overall.

Figure 3:
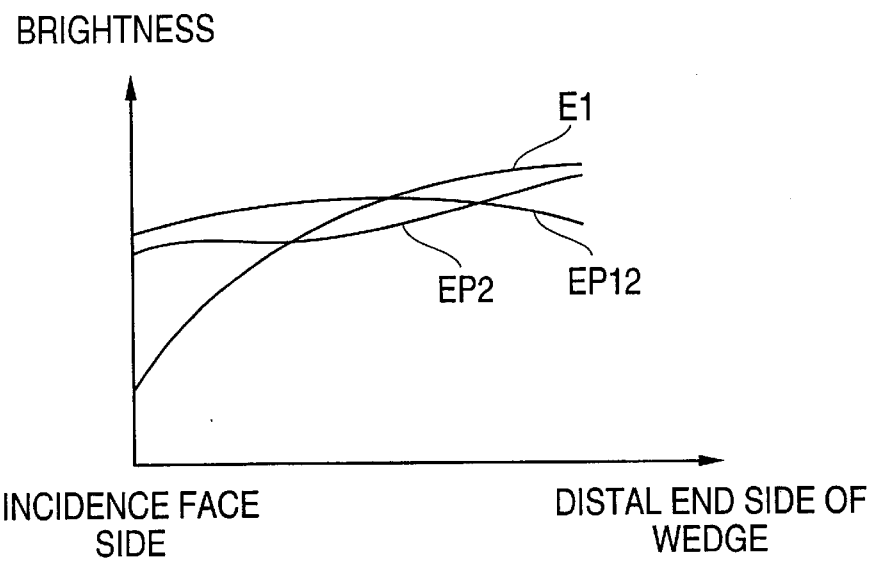
FIG. 3 is a graph to illustrate emission intensity characteristics (variation of brightness)

If the transparent light guide plate 2 is thin at the incidence face 2A and none of the emission promotion regions P1, P2 are formed, brightness variation depending on distance from the incidence face 2A is caused as curve E1 shown in FIG. 3. That is, except for disturbance due to bright lines, brightness rises according to distance from the incidence face 2A.

Figure 4:
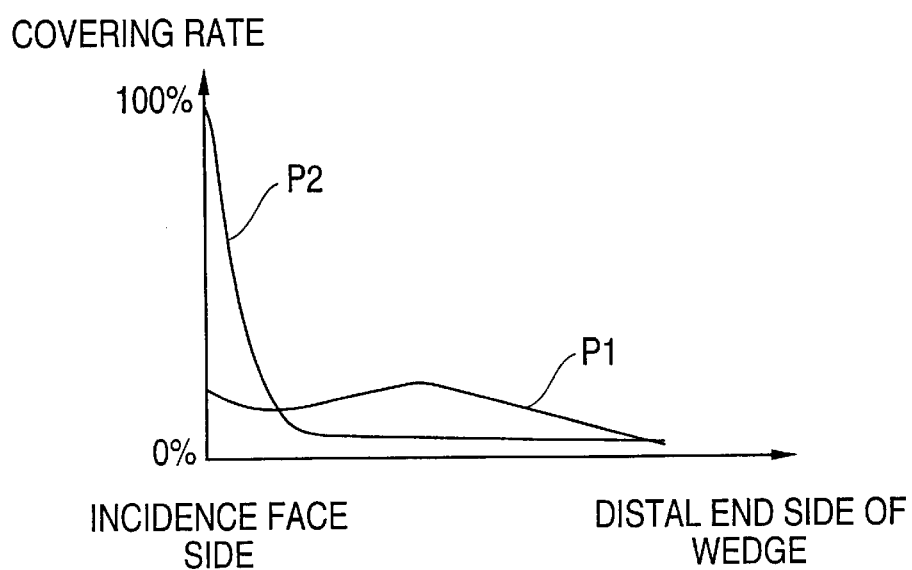
FIG. 4 is a graph to illustrate a distribution (covering rate variation) of first and second emission. promotion regions.

Covering rate of the regions P2 is determined, for instance, according to a curve denoted by symbol P2 in FIG. 4. That is, covering rate of the regions P2 is about 100% at an edge portion of the incidence face and falls sharply in the vicinity of the incidence face, then falling gently. Such a curve P2 provides, without forming the regions P2, a brightness variation as curve EP2 shown in FIG. 3. Attention should be paid to a fact that curve EP2 has a gentler gradient as compared with that of curve E1.

Further to this, covering density of the regions P1 is determined, for instance, according to a curve denoted by symbol P1 in FIG. 4. Curve P1 is plotted like an asymmetric hill gently rising around a center portion. Such a curve P1 changes the brightness curve EP2 to different brightness curve EP12 as shown in FIG. 3. Attention should be paid again to another fact that curve EP12 has a still gentler gradient as compared with that of curve E1. Thus, brightness (emission intensity) on the emission face 2C is uniformalized as a whole.

Precisely saying, the curve EP12 rises slightly around a center portion. Such a characteristic curve gives a viewer a natural feeling, being rather desirable.

Figure 5:
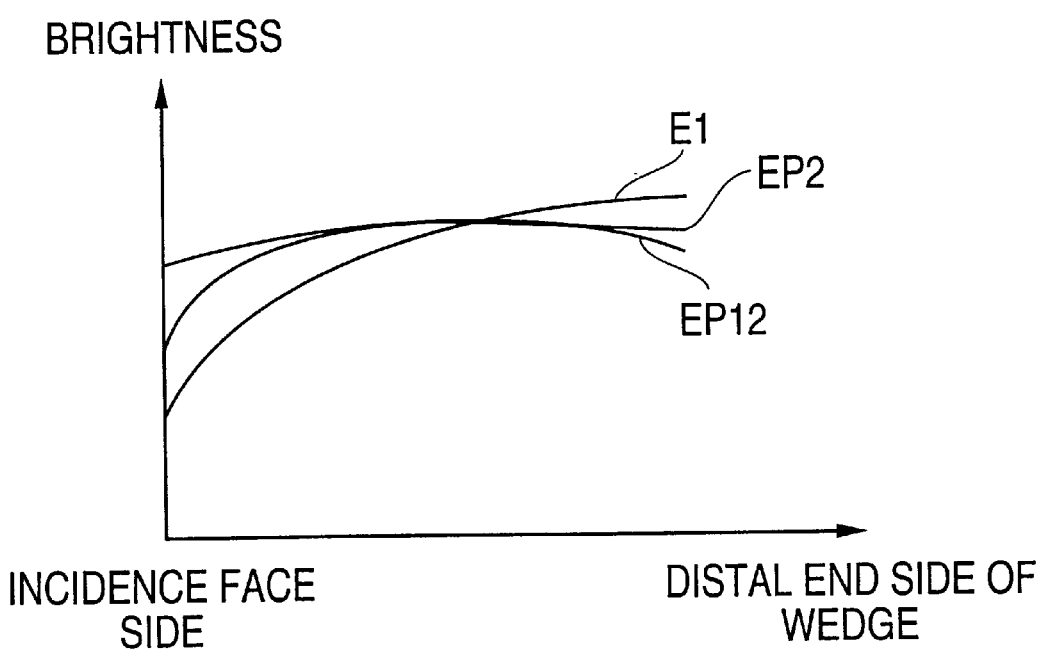
FIG. 5 is a graph to illustrate emission intensity characteristics (variation of brightness) in a case where a light guide plate has a great thickness at an incidence face.

Next, if the transparent light guide plate 2 is thick at the incidence face 2A and none of the emission promotion regions P1, P2 are formed, brightness variation depending on distance from the incidence face 2A is caused as curve E1 shown in FIG. 5. That is, except for disturbance due to bright lines, brightness rises sharply according to distance from the incidence face 2A and then rises gently. In other words, rising occurs in a portion nearer to the incidence face 2A as compared with the case of E1 in FIG. 3.

Under this condition, if the regions P2 are formed in accordance with the foresaid curve P2 (see FIG. 4), a brightness variation as curve EP2 shown in FIG. 5 is obtained. The curve EP2 has a gentler gradient as compared with that of curve E1. In particular, a high degree of flatness is realized between a center portion and a distal end of the wedge-shape.

Further to this, covering density of the regions P1 is determined, for instance, to according to a curve denoted by symbol P1 in FIG. 4. As a result, the brightness curve EP2 shown in FIG. 5 is changed to a different brightness curve EP12. The curve EP12 has a still gentler gradient as compared with that of curve E1.

Thus, brightness (emission intensity) on the emission face 2C is uniformalized as a whole. Precisely saying, the curve EP12 rises also slightly around a center portion. Such a characteristic curve gives a viewer a natural feeling, being rather preferable as compared with a perfect flat characteristics.

According to design in the present embodiment, diameter of first emission promotion region P1 is about 25 μm. and, diameter of second emission promotion region P2 is about 20 μm.

The regions P1, P2 are arranged with an irregularity on the emission face 2C. This prevents an overlapped arrangement with a fine periodical structure of the liquid crystal display panel LP from causing Moire fringes.

The emission promotion regions P1, P2 may be formed, for instance, as follows. The regions P1 with rough surfaces can be formed, for example , by machining of a mold used in molding of light guide plate or deposition of ink having a light diffusibility. The second emission promotion regions P2 can be formed, for example, by impinging of fine glass beads onto a mold used in molding of light guide plate or light guide plate itself. The glass beads are blasted with the use of air flow toward the object to be processed, producing an irregular arrangement of regions P2.

In order to give an irregularity to the arrangement of the first emission promotion regions P1, after an arraying positions are decided provisionally with a pitch in accordance with the foresaid covering rate variation, individual positions are shifted randomly by a very small distance according to a calculation based on a random number table. Machining of a mold is performed according to the resultant arrangement after this shifting.

As described above, the present embodiment easily achieves both prevention of reflective appearance and overall uniformalized brightness through an intermingledly distributed arrangement of emission promotion regions P1, P2 provided with different emission promotion abilities and through adjusting of their distributions.

If covering density of the regions P2 is set large in the vicinity of the incidence face 2A to occupy an area among the regions P1 without blank reflective appearance is avoided effectively. Through adjusting covering density of regions P1 having a relatively large emission promotion ability, a wide controllable range of emission promotion ability can be obtained. Such advantages are particular to the present invention.

(2)Other Embodiments (Modifications)

None of the above embodiments aim to be limitative for the scope of the present invention. For instance, the following modifications are allowed.

(a) In the above embodiments, description focused on prevention of reflective appearance caused in the vicinity of an incidence face. However, the present invention may be applied to cases where prevention of reflective appearance caused by "flank face edges" is intended. It is noted that "flank faces" are the right and left side faces adjacent to the incidence face 2A.

In order to prevent the flak face edges from causing reflective appearance effectively, its is preferable that the second emission promotion regions P2 are arranged among the first emission promotion regions P1 without blank not only in the vicinity of not only the incidence face but also the right and left flank faces (i.e. around both side edges of the emission face 2C or back face 2B).

(b) In the case of the above embodiment, two kinds of emission promotion regions are employed in combination. Needless to say, three or more kind of emission promotion regions provided with different emission promotion abilities may be employed in combination.

(c) In the above embodiment, the emission face 2C provides an emission promotion face. This does not limit the scope of the present invention. That is, a back face of a light guide plate may provide an emission promotion face. In that case, distributions of regions P1 and P2 may be similar to those of the above embodiment. It should be noted that the case will cause the emission promotion regions P1, P2 produce scattered light directed to the emission face 2C. Such scattered light escapes from the emission face 2C easily, being an illumination output after passing through the prism sheet 5.

(d) In the above embodiment, the back face of light guide plate provides a prismatic face. This does not limit the scope of the present invention. That is, the emission face may provide a prismatic face. Alternatively, the present invention may be applied to cases where none of the back and emission face may provide a prismatic face.

(e) The prism sheet 2 is only an example of additional sheets, limiting nothing of the present invention. Even if other additional sheets or no additional sheet may be employed, the present invention is applicable.

(f) The light guide plate may be made of a material other than transparent resin. For example, light scattering guide having inside scattering power may be employed. Properties, producing methods and others of light scattering guide are known well.

(h) Two or more incidence faces may be provided by side end faces. Correspondingly, a plurality of primary light sources may be arranged.

(i) A primary light source may be provided with a light source element other then rod-like one such as fluorescent lamp. For example, point-like light sources such as LEDs may be arranged to provide a primary light source.

(j) The present invention may be applied to uses other than backlighting for liquid crystal display. For example, it may be applied to frontlighting for liquid crystal display or broadly various illumination devices and displays.

What is claimed is:

1. A light guide plate comprising an incidence face provided by a minor face for light input, an emission face for light output and a back face provided by major faces, respectively, wherein said major faces include an emission promotion face on which first emission promotion regions and second emission promotion regions are intermingled according to a distribution, said second emission promotion regions having an emission promotion ability per unit area smaller than that of said first emission promotion regions, said distribution being set so that covering density of said first emission promotion regions and that of said second emission promotion regions vary depending on position in said emission promotion face.

2. A light guide plate according to claim 1, wherein said second emission promotion regions are arranged among said first emission promotion regions without blank.

3. A light guide plate according to claim 1 or 2, wherein said covering density of said second emission promotion regions tends to decrease according to distance from said incidence face.

4. A surface light source device including a primary light source and a light guide plate, said light guide plate comprising an incidence face provided by a minor face, an emission face for light output and a back face provided by major faces, respectively, and the light guide plate being arranged so that said light guide plate is supplied with light by said primary light source through said incidence face to cause said emission face to give an illumination output, wherein said major faces include an emission promotion face on which first emission promotion regions and second emission promotion regions are intermingled according to a distribution, said second emission promotion regions having an emission promotion ability per unit area smaller than that of said first emission promotion regions, said distribution being set so that covering density of said first emission promotion regions and that of said second emission promotion regions vary depending on position in said emission promotion face.

5. A surface fight source device according to claim 4, wherein said second emission promotion regions are arranged among said first emission promotion regions without blank.

6. A surface light source device according to claim 4 or 5, where in said covering density of said second emission promotion regions tends to decrease according to distance from said incidence face.

7. A liquid crystal display including a liquid crystal display panel and a surface light source device, said surface light source device comprising a primary light source and a light guide plate, said light guide plate having an incidence face provided by a minor face, an emission face for light output and a back face provided by major faces, respectively, and the light guide plate being arranged so that said light guide plate is supplied with light by said primary light source through said incidence face to cause said emission face to give an illumination output, wherein said major faces include an emission promotion face on which first emission promotion regions and second emission promotion regions are intermingled according to a distribution, said second emission promotion regions having an emission promotion ability per unit area smaller than that of said first emission promotion regions, said distribution being set so that covering density of said first emission promotion regions and that of said second emission promotion regions vary depending on position in said emission promotion face.

8. A liquid crystal display according to claim 7, wherein said second emission promotion regions are arranged among said first emission promotion regions without blank.

9. A liquid crystal display according to claim 7 or 8, wherein said covering density of said second emission promotion regions tends to decrease according to distance from said incidence face.

* * * * *